Inventor
WILHELM FREY
ATTORNEY

United States Patent Office 3,402,771
Patented Sept. 24, 1968

3,402,771
DEVICE FOR THE PRODUCTION OF PHYSICAL FIRE-FIGHTING FOAM HAVING A HIGH DEGREE OF FOAMINESS
Wilhelm Frey, Dettingen an der Erms, Germany, assignor to Minimax Aktiengesellschaft, a German firm
Filed Sept. 29, 1966, Ser. No. 582,846
Claims priority, application Germany, Oct. 13, 1965, M 66,924
8 Claims. (Cl. 169—15)

ABSTRACT OF THE DISCLOSURE

Device for the production of high foam to liquid ratio fire-fighting foam wherein at least two separate nozzle systems of different rates of delivery of a mixture of water and foaming agent are arranged in a chamber between a screen and a fan which produces a stream of air, the nozzle systems being operable either jointly or separately, as desired. Provision is made for admixing a gas such as $CO_2$ with the stream of air passing through the chamber with or without the nozzle systems.

---

Figure 1:
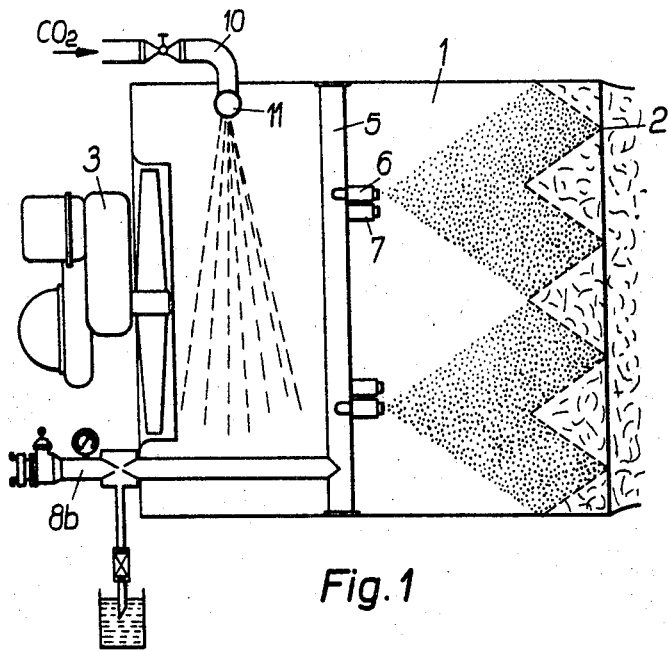

Physical fire-fighting foams having a high degree of foaminess have become particularly important in fire-fighting technique, especially in recent times. By a foam "having a high degree of foaminess" is meant here a fire-fighting foam which exhibits a liquid to foam ratio of approximately 1:1000, i.e., one unit of liquid produces 1000 units of foam. One of the main advantages of the use of such foam is the ability of the foaming agent to produce an enormous volume of foam from a limited supply of water. To give an idea of the order of magnitude, it may be mentioned that fire extinguishers permitting the generation of 6677.5 m.³ of foam per minute have been constructed in this connection. During fire fighting, the burning object is completely enveloped or covered by the large volume of generated foam, whereby underneath the foam cover an atmosphere is established and maintained which has a high vapor content and which in this way checks the fire; also, if maintained for a sufficiently long time, this atmosphere cools and completely extinguishes the burning material.

Because of its extremely high foam to liquid ratio, this fire-fighting foam is very light and dry. This contrasts with a number of fire-fighting foams which, compared with the former, should be designated as "heavy foams" which as a rule are prepared from a foam concentrate consisting of a protein hydrolyzate. For the preparation of the light foams presently in question a foam concentrate is used which from the chemical point of view belongs to the class of tensides and is a quite specific aliphatic alcohol.

The preparation of the foam itself takes place by means of so-called foam generators which consist of a chamber closed on one side by a screen area; through this chamber a stream of air is passed which penetrates through the screen area; in the space between the inlet of the air into the chamber and the screen area, said chamber contains spray nozzles which spray the supplied mixture of water and foaming agent on the screen area. The screen area itself consists, as a rule, of a nylon cloth, while the stream of air is generated by a fan disposed in the wall of the chamber. The foam produced on the screen area is carried off and conveyed to the burning object through large textile hoses having an inside diameter of 1000 mm. or more.

The normal foam generators are designed for a fixed liquid to foam ratio, which is often 1:1000. Nevertheless, a demand occasionally arose in practice for a foam generator which offers the possibility of varying the liquid to foam ratio during the operation, thus permitting a certain adaption to different fire conditions and burning materials. This variation of the liquid to foam ratio should, however, be capable of being effected in a simple manner, without leading to additional complication of the foam generator.

This problem is solved, according to the present invention, by arranging in the device, with a view to varying the liquid to foam ratio, at least two separate nozzle systems in the chamber, each of which delivers the mixture of water and foaming agent at a different rate, and these nozzle systems may be operated either jointly or separately, as desired.

It is possible, through a suitable choice of the characteristics of the nozzle systems, to prepare, by means of the device forming the object of the present invention, a light foam exhibiting liquid to foam ratios of 1:300, 1:500 or 1:1000, as desired, to give only one example. The change from one liquid to foam ratio to another may in this case be effected by a simple turn of a stopcock.

Furthermore, it has been discovered that it is expedient to arrange in the chamber admixing devices for gases to be added to the stream of air passing through the chamber. As an admixture gas, $CO_2$ enters particularly into consideration. In this way the device offers the possibility of admixing gaseous $CO_2$ with the stream of air. The $CO_2$ will then be enclosed in the foam bubble and conveyed to the burning object. In this way it is possible to extinguish even those fires which would otherwise continue burning by utilizing the small amount of oxygen naturally present below the foam cover. The addition of $CO_2$ to heavy foams of high water content has not been possible on a larger scale because the $CO_2$ would dissolve in the water. Surprisingly, however, it has been found according to the present invention that, in the case of the new light foam exhibiting a high foam to liquid ratio, such an addition is possible.

Figure 2:
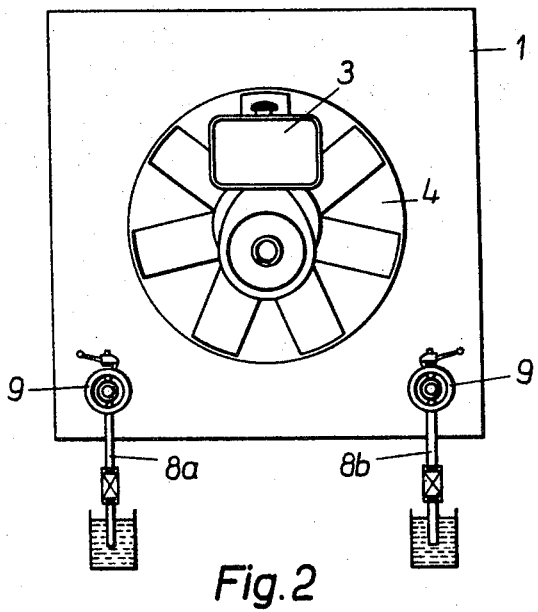

The drawing represents a form of construction in accordance with the present invention. Shown are:

FIG. 1: Side view of a device according to the present invention, in axial section;

FIG. 2: Side view of the device shown in FIG. 1, rotated by 90°.

The device for the production of the fire-fighting foam, the foam generator, consists of a chamber 1 which is closed on one side by a screen area 2 consisting of a nylon cloth. Through this chamber a stream of air may be passed, the stream of air being produced by a fan 3 disposed in the region of the chamber wall opposite screen area 2. Between screen area 2 and inlet 4 of the stream of air into chamber 1, at least two separate nozzle systems 6 and 7, delivering the mixture of water and foaming agent at different rates, are arranged. Nozzle systems 6 and 7 are respectively connected to pipes 5 leading to separate hose attachments 9 disposed on the outside surface of the chamber. In pipes 5 are situated admixing jet pumps 8a and 8b which aspirate the foaming-agent concentrate from the corresponding reservoirs and admix it with the water supplied at 9.

Each of the nozzle systems 6 and 7 is, respectively, distributed in an essentially uniform manner over a cross section of chamber 1 parallel to screen area 2, so that the mixture of water and foaming agent sprayed by the nozzle system always impinges on screen area 2 in the uniform manner schematically represented in FIG. 1. When, for example, the liquid delivery of one of the nozzle systems, 6, amounts to 200 l./min. while that of the other nozzle system, 7, is 400 l./min., the following different liquid to foam ratios may be brought about when the rate of flow of the stream of air produced by fan 3 is maintained at the level which in the case of a liquid delivery of 200 l./min. produces a liquid to foam ratio of 1:1000:

Nozzle system 6 (200 l./min.) in operation ____ 1:1000
Nozzle system 7 (400 l./min.) in operation ____ 1:500
Both nozzle systems (600 l./min.) in operation _ 1:300

Naturally, it would be possible to provide additional nozzle systems of different characteristics, which could be operated separately.

Arranged in the space between inlet 4 of the air into chamber 1 and nozzle systems 6 and 7 are gas supply tubes 11 provided with gas outlets uniformly distributed over the width of the air stream. Through a supply tube 10 containing an appropriately designed valve, an admixture gas is delivered to the gas supply tubes 11 so that this admixture gas is uniformly admixed with the air stream entering chamber 1 at 4, before the air stream strikes the spray delivered by the nozzle systems, or before it impinges on screen area 2. This ensures that the foam bubbles produced on screen area 2 are uniformly filled with the mixture of gas and air which is produced in this way. In addition to inert gases, gaseous $CO_2$ is particularly suitable for use as an admixture gas.

I claim:

1. Device for the production of physical fire-fighting foam exhibiting a high foam to liquid ratio, consisting of a chamber which is closed on one side by a screen area and through which a stream of air is passed which penetrates through the screen area, said chamber containing in the space between the inlet of the air stream into the chamber and the screen area spray nozzles which spray the supplied mixture of water and foaming agent on the screen area; said device being characterized by the fact that in order to change the liquid to foam ratio, at least two separate nozzle systems (6, 7) of different rates of delivery of the mixture of water and foaming agent are arranged in chamber (1), said nozzle systems being operable either jointly or separately, as desired.

2. Device according to claim 1, characterized by the fact that the nozzles (6, 7) of each system are respectively distributed in an essentially uniform manner over a cross section of chamber (1) parallel to screen area (2).

3. Device according to claim 1, characterized by the fact that admixing devices (10, 11) are coordinated to chamber (1) for gases to be admixed with the stream of air passing through chamber (1).

4. Device according to claim 3, characterized by the fact that gas supply tubes (11) with gas outlets uniformly distributed over the width of the air stream are arranged in the space between the inlet (4) of the air stream into the chamber (1) and the nozzle systems (6, 7).

5. Device according to claim 2, characterized by the fact that admixing devices (10, 11) are coordinated to chamber (1) for gases to be admixed with the stream of air passing through chamber (1).

6. Device according to claim 5, characterized by the fact that gas supply tubes (11) with gas outlets uniformly distributed over the width of the air stream are arranged in the space between the inlet (4) of the air stream into the chamber (1) and the nozzle systems (6, 7).

7. Device for the production of physical fire-fighting foam exhibiting a high foam to liquid ratio, consisting of a chamber which is closed on one side by a screen area and through which a stream of air is passed which penetrates through the screen area, said chamber containing in the space between the inlet of the air stream into the chamber and the screen area spray nozzles which spray the supplied mixture of water and foaming agent on the screen area; said device being characterized by the fact that admixing devices (10, 11) are coordinated to chamber (1) for gases to be admixed with the stream of air passing through chamber (1) whereby foam bubbles produced on screen area (2) are filled with a mixture of gas and air.

8. Device according to claim 7, characterized by the fact that gas supply tubes (11) with gas outlets uniformly distributed over the width of the air stream are arranged in the space between the inlet (4) of the air stream into the chamber (1) and the spray nozzles.

References Cited

UNITED STATES PATENTS

| | | | |
|---|---|---|---|
| 1,919,616 | 7/1933 | Boyd | 169—15 |
| 2,502,143 | 3/1950 | Getz | 169—11 |
| 2,645,292 | 7/1953 | Williams | 169—15 |
| 2,826,399 | 3/1958 | Eriksson | 169—15 X |
| 2,933,140 | 4/1960 | Gagliardo | 169—15 |
| 3,142,340 | 7/1964 | Jamison | 169—15 |

SAMUEL F. COLEMAN, *Primary Examiner.*